United States Patent [19]
Hein

[11] Patent Number: 5,896,971
[45] Date of Patent: Apr. 27, 1999

[54] ROTATIONAL CONTROL APPARATUS WITH ENHANCED COOLING AND POWER TRANSFER CHARACTERISTICS

[75] Inventor: Dave W. Hein, Oakdale, Minn.

[73] Assignee: Horton, Inc., Minneapolis, Minn.

[21] Appl. No.: 08/865,387

[22] Filed: May 29, 1997

[51] Int. Cl.[6] ............................................. F16D 26/0635
[52] U.S. Cl. ............................... 192/85 CA; 192/113.23; 192/113.26; 192/110 B; 384/538; 411/24
[58] Field of Search ......................... 192/85 CA, 113.23, 192/113.26, 110 B; 384/517, 538, 563; 403/373, 374, 370; 411/24, 26, 27, 28, 33

[56] References Cited

U.S. PATENT DOCUMENTS

| | | | |
|---|---|---|---|
| 2,241,241 | 5/1941 | Clouse | 192/113.23 |
| 2,241,242 | 5/1941 | Friedman | 192/113.23 |
| 2,944,647 | 7/1960 | Twyman | 192/18 R |
| 2,976,975 | 3/1961 | Thostenson et al. | 192/70.12 |
| 3,667,581 | 6/1972 | Hanks | 192/18 A |
| 3,958,888 | 5/1976 | Mullenberg | 403/13 |
| 3,998,563 | 12/1976 | Kloren | 403/370 |
| 4,020,937 | 5/1977 | Winter | 192/113.23 X |
| 4,025,213 | 5/1977 | Schafer et al. | 403/370 |
| 4,132,301 | 1/1979 | Zabonick | 192/110 B X |
| 4,135,612 | 1/1979 | Lengsfeld | 192/18 B |
| 4,235,573 | 11/1980 | Peter et al. | 403/13 |
| 4,354,769 | 10/1982 | Peter | 403/248 |
| 4,382,497 | 5/1983 | Sakai et al. | 192/113.23 |
| 4,781,486 | 11/1988 | Mochizuki | 403/303 |
| 4,899,861 | 2/1990 | Cummings, III | 192/110 B X |
| 4,923,043 | 5/1990 | Okuno | 192/70.12 |
| 5,005,686 | 4/1991 | Reik et al. | 192/113.23 X |
| 5,188,480 | 2/1993 | Okuno | 403/369 |
| 5,279,182 | 1/1994 | Fukushima | 74/572 |

FOREIGN PATENT DOCUMENTS

| | | |
|---|---|---|
| 3189419 | 8/1991 | Japan. |
| 739278 | 6/1980 | U.S.S.R. . |
| 914836 | 3/1982 | U.S.S.R. . |

OTHER PUBLICATIONS

Corrective Maintenance Instructions, Diesltemp® P.T.O Fan Clutch, Horton Industries, Inc., Form No. L–22307–0–0592 (May 1992).

Horton® P.T.O. Fan Clutch, Form No. L–22438–0–0493, ©S.A. Horton International N.V. 1993.

Installation and Maintenance Instructions, Model 918260 P.T.O. Fan Clutch, Horton Manufacturing, Co., Inc., Form No. L–20273–A–0994 (Sep. 1994).

*Primary Examiner*—Rodney H. Bonck
*Assistant Examiner*—Ankur Parekh
*Attorney, Agent, or Firm*—Alan Kamrath; Peterson Wicks Nemer & Kamrath, P.A.

[57] ABSTRACT

An apparatus (10) for controlling the transmission of rotational forces between first (14) and second (66) members through an axially shiftable friction element (56) that rotates in unison with the first member (14) and can be selectively brought into engagement with the second member (66) is provided with a forced air cooling system that functions to cool the interface between the friction element (56) and the second member (66), as well as a first bearing (54) allowing relative rotation between the friction element (56) and an actuation member (38). A flow of cooling air is developed during operation of the apparatus by fins (172,174) formed about an outer radial surface portion of the friction element (56) and the air is caused to flow through enlarged lobe cut-out sections (156) in the second member (66) along the interface and through holes (164) formed in the friction element (56) which are arranged opposite the first bearing (54). The apparatus also incorporates a power transfer assembly that is extends directly adjacent an additional rotatable support bearing (30,80) that is mounted directly adjacent an end portion (16,18) on the first member (14). The power transfer assembly includes a coupling unit (102, 137) which interconnects a power transfer member (88,126) to the end portion (16,18) of the first member (14) by developing a radial clamping force therebetween, while also functioning to axially retain the additional bearing (30,80) without inducing axially stresses on the additional bearing (30,80) during operation of the apparatus (10).

21 Claims, 2 Drawing Sheets

5,896,971

ROTATIONAL CONTROL APPARATUS WITH ENHANCED COOLING AND POWER TRANSFER CHARACTERISTICS

BACKGROUND OF THE INVENTION

The present invention relates generally to apparatus for controlling the transmission of rotational forces between first and second relatively rotatable members. More particularly, the invention is directed to the arrangement of a forced air cooling system and a power transfer coupling incorporated in a rotational control apparatus in order to increase the useful life and minimize required service operations for the apparatus.

It is often desired to selectively interconnect a rotatable power transmission member with an output element in order to either couple the output element with the power transmission member for concurrent rotation or to brake the power transmission member. For instance, when it is desired to intermittently transmit rotational forces from a power transmission member to a relatively rotatably output element, it is commonplace to interconnect the components with a clutch and then to selectively activate and deactivate the clutch as needed. Known clutch arrangements can be controlled utilizing electrical, mechanical, pneumatic or hydraulic based actuation systems which typically function to axially shift a friction disc, that is mounted for concurrent rotation with the power transfer member, into engagement with the output element.

When the friction disc engages the output element, a significant amount of thermal energy is developed at the friction interface. The rate at which this thermal energy can be dissipated directly affects the permissible cycling times for the apparatus. For this reason, it is also known in the art to provide a flow of cooling air to the friction interface to increase the thermal dissipation capacity of the friction disc in order to allow for greater cycling times. of course, the various components of the rotational control apparatus must be mounted through suitable bearings to enable relative rotation therebetween. Although it is desired to design the apparatus so as to be as compact as possible in order to minimize material and assembly costs, care must be taken in the design of such apparatus to avoid exposing the bearings to excessive heat factors, which can result in grease breakdown, and unnecessary loading, which can cause premature bearing failure.

Based on the above problems, clutch and brake manufacturers are often forced to size rotational control apparatus larger than desired and to specifically configure the components to avoid undue loading and heat exposure of the bearings. Therefore, there exists a need in the art for a rotational control apparatus which is extremely compact, but yet which is designed to ensure an enhanced useful life.

SUMMARY OF THE INVENTION

The present invention solves these and other deficiencies and problems in the art by providing a rotational control apparatus that is axially compact, incorporates an enhanced cooling system and avoids the development of axial bearing stresses to increase the useful life of the apparatus. In the preferred form, the apparatus controls the transmission of rotational forces between first and second members through an axially shiftable friction element that rotates in unison with the first member and which can be selectively brought into engagement with the second member. A forced air cooling system is provided to ensure a flow of cooling air over the interface between the friction element and the second member, as well as a first bearing used to rotatably mount the friction element. The flow of cooling air is developed during operation of the apparatus by fins formed about an outer radial surface portion of the friction element and the air is caused to flow through enlarged lobe cut-out sections in the second member, along the interface and through holes formed in the friction element. These holes are advantageously arranged opposite the first bearing such that the first bearing is maintained cool to prevent grease breakdown.

In further accordance with a preferred embodiment of the invention, the rotational control apparatus also incorporates a power transfer assembly that axially retains an additional rotatable support bearing mounted directly adjacent an end portion on the first member. The power transfer assembly includes a coupling unit which interconnects a power transfer member to the end portion of the first member by developing a radial clamping force therebetween, while also performing the function of retaining the additional bearing in a desired axial position. The radial clamping forces essentially establish a rigid joint between the first member and the power transfer member such that axial forces are not developed which may induce stresses on the additional bearing during operation of the apparatus.

It is thus an object of the present invention to provide an apparatus for controlling relative rotation between two members which is axially compact, thereby reducing manufacturing and packaging costs.

It is also an object of the present invention to provide an effective forced air cooling system in connection with a rotational control apparatus in order to enhance the dissipation of heat generated during operation of the apparatus.

It is a further object of the present invention to provide an improved interconnection between a power transfer member and a power transmission member of the apparatus that will enable the power transfer member to additionally function to axially retain a bearing, but yet will not induce axial stresses in the bearing during operation of the apparatus.

These and other objects, features and advantages of the present invention will become more readily apparent from the following detailed description of a preferred embodiment of the invention when taken in conjunction with the drawings wherein like reference numerals refer to corresponding parts in the several views.

Figure 1:
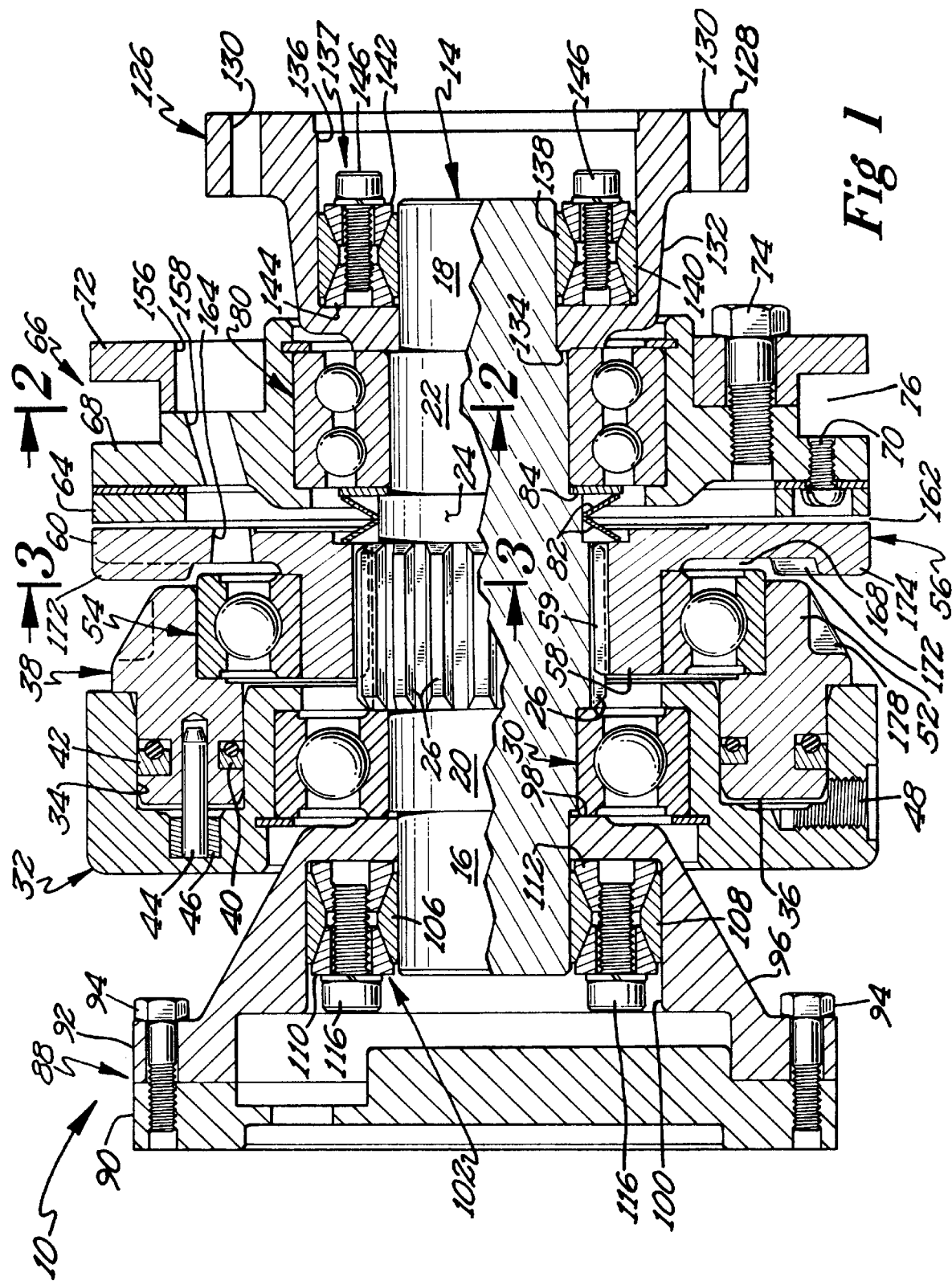
FIG. 1 is a partial cross-sectional view of a rotational control apparatus constructed in accordance with a preferred embodiment of the present invention.

It should be noted that all of the figures are drawn for ease of explanation of the basic teachings of the present. invention only: the extension of the Figures with respect to number, position, relationship and dimensions of the parts to form the preferred embodiment will be explained or will be within the skill of the art after the following teachings of the present invention have been read and understood. In addition, the exact dimensions and dimensional proportions to conform to specific force, weight, strength and similar requirements will likewise be within the skill of the art after the following teachings of the present invention have been read and understood.

Furthermore, when the terms "inner", "outer", "first", "second", "radially", "axially", "circumferentially" and similar terms are used herein, it should be understood that these terms have reference only to the structure shown in the drawings as it would appear to a person viewing the drawings and are utilized only to facilitate describing the invention.

DETAILED DESCRIPTION OF THE PREFERRED EMBODIMENT

With initial reference to FIG. 1, a rotational control apparatus constructed in accordance with the preferred teachings of the present invention is generally indicated at 10. Rotational control apparatus 10 includes a power transmission member 14 that preferably takes the form of a shaft having first and second end portions 16 and 18, lands 20 and 22 and a central portion 24. Central portion 24 is preferably integrally formed with a plurality of splines 26.

Power transmission member 14 is permitted to rotate, due to the presence of a first bearing unit 30, relative to a fixed support member 32. Fixed support member 32 defines an annular chamber 34 into which extends a piston body portion 36 of an actuation member 38. Piston body portion 36 is formed with inner and outer radial grooves within which are positioned inner and outer radial seals 40 and 42. Actuation member 38 is permitted to shift axially relative to fixed support member 32 but is prevented from rotating relative thereto by means of a plurality of annularly spaced pins, one of which is indicated at 44, which are secured to piston body portion 36 of actuation member 38 and which slidably extend within bushings 46 located in bores formed in fixed support member 32. Fixed support member 32 is also formed with a fluid inlet conduit 48 that leads to annular chamber 34. As clearly shown in FIG. 1, fluid inlet conduit 48 is preferably internally threaded to permit a fluid supply connector to be readily attached thereto in order to enable a supply of actuation fluid to be selectively introduced into and released from annular chamber 34 in order to axially shift actuation member 38 relative to a fixed support member 32.

Actuation member 38 also includes an extension portion 52 that is fitted with an outer race of a second bearing unit 54 to allow relative rotation with a friction element 56. Friction element 56 includes an annular portion 58 having splines 59 for slidable receipt on splines 24 of power transmission member 14. A disc portion 60 extends radially outwardly from annular portion 58. Due to their connection through splines 26 and 59, friction element 56 rotates in unison with power transmission member 14, but can shift axially relative to power transmission member 14 through the introduction of pressurized fluid within annular chamber 34. Axial shifting of friction element 56 causes disc portion 60 to engage an interface element 64 attached to an output element 66.

In the preferred embodiment shown in the drawings, rotational control apparatus 10 actually constitutes a fan clutch and therefore output element 66 constitutes a clamping unit used to secure a plurality of fan blades, which are arranged at circumferentially spaced positions about a mounting ring. Output element 66 includes a first output member 68, to which interface element 64 is secured by means of a first set of threaded fasteners 70, and a second output member 72 that is secured to first output member 68 by means of a second set of threaded fasteners 74. Between the first and second output members 68 and 72, at the outer radial portion of output element 66, is defined an annular mounting recess 76. Recess 76 is adapted to receive the mounting ring for an output unit in the preferred embodiment in the form of fan blades which is clamped in position upon securing of second output member 72 to first output member 68 through the second set of threaded fasteners 74.

Output element 66 is mounted for rotation relative to power transfer member 14 by means of a third bearing unit 80 having an outer race retained by output element 66 and an inner race fitted upon land 22 of power transmission member 14. When rotational control apparatus 10 assumes the position shown in FIG. 1, power transmission member 14 is permitted to rotate relative to output element 66. However, upon supplying of pressurized fluid into annular chamber 34, actuation member 38 will be shifted axially towards output element 66 so as to cause friction element 56 to engage interface element 64 in order to rotationally couple friction element 56 and output element 66. Friction element 56 is biased to a disengaged position by means of springs 82 which extend between inner radial portion 58 of friction element 56 and a retainer ring 84 sandwiched between the inner race of third bearing unit 80 and central portion 24.

Rotational control apparatus 10, in the most preferred form, is adapted to be mounted on a crankshaft of a diesel or other type of vehicle engine. Therefore, power transmission member 14 is adapted to be drivingly connected to an engine crankshaft. Although the particular connection arrangement can vary depending upon the type of engine to which rotational control apparatus 10 is secured, in accordance with the preferred embodiment shown in FIG. 1, power transmission member 14 is adapted to be attached to an engine crankshaft through a power transfer member 88 including a first flange member 90 and a second flange member 92 that are interconnected by a plurality of circumferentially spaced threaded fasteners 94. Second flange member 92 includes an axial end portion 96 that extends radially about first end portion 16 of power transmission member 14 and which terminates in a radially extending surface 98. As clearly shown in FIG. 1, radially extending surface 98 is positioned directly adjacent the inner race of first bearing unit 30 and is used to axially position and hold the inner race of first bearing unit 30 against central portion 24. Axial end portion 96 of second flange member 92 includes an inner axial surface 100 that is interconnected with first end portion 16 of power transmission member 14 through a coupling unit 102.

By this arrangement, rotational control apparatus 10 is made more axially compact by positioning radially extending surface 98 of second flange member 92 directly adjacent the inner race of first bearing unit 30, however, in accordance with the present invention, it is desired to prevent pre-stressing of the inner bearing race which could induce stresses that, when combined with the stresses from normal service operation, could cause premature bearing failure. Inducing stresses upon first bearing unit 30 by power transfer member 88 during operation of rotational control apparatus 10 is prevented due to the structure of coupling unit 102.

Specifically, coupling unit 102 includes first and second radially spaced, annular wedge elements 106 and 108, first and second axially spaced, annular wedge elements 110 and 112 and a plurality of threaded fasteners 116. As clearly shown in FIG. 1, each of the first and second radially spaced, annular wedge elements 106 and 108 radially tapers, along its axial length, from a central, axial portion thereof and is positioned against a respective one of first end portion 16 of power transmission member 14 and inner axial surface 100 of second flange member 92. On the other hand, each of the first and second axially spaced, annular wedge elements 110 and 112 axially tapers along its axial length, from a central, radial portion thereof and is preferably formed as a generally truncated, conical wedge element. Wedge elements 110 and 112 are positioned, in an axially spaced manner, between the first and second radially spaced, annular wedge elements 106 and 108. In addition, threaded fasteners 116 extend through annularly spaced holes formed in annular wedge element 110 and are threadably received within bores formed in annular wedge element 112 and are positioned radially intermediate wedge elements 106 and 108.

With this arrangement, threaded fasteners 116 can be tightened to draw first and second axially spaced, annular wedge elements 110 and 112 toward one another. Due to the conical shape of wedge elements 110 and 112 and the tapering of wedge elements 106 and 108, this drawing of wedge elements 110 and 112 towards each other causes wedge elements 106 and 108 to be forced radially so as to frictionally interconnect power transfer member 88 to power transmission member 14 such that torque is transmitted by coupling unit 102 through surface pressure. Due to the construction of coupling unit 102, all of the forces generated during operation of rotational control apparatus 10 is either transmitted outwardly against power transfer member 88 or inwardly against power transmission member 14. Therefore, no axial forces are applied against the inner race of first bearing unit 30, but rather an internal clearance for the bearing can be maintained during operation of rotational control apparatus 10, thereby increasing the effective service life of bearing unit 30. In addition, coupling unit 102, which substantially constitutes a tapered lock joint, establishes a rigid connection between power transmission member 14 and power transfer member 88, thereby eliminating any shock loading upon power transmission member 14 and also eliminating any fretting corrosion build-up. In the preferred embodiment, each of the wedge elements 106, 108, 110 and 112 are formed from metal with ground tapered surfaces. It should be noted that coupling unit 102 also accomplishes an effective power transfer while acting upon substantially smooth surfaces defined by first end portion 16 and inner axial surface 100, thereby avoiding the need to form splines or other directly interengaging drive surfaces between these members.

In the preferred embodiment shown and described, rotational control apparatus 10 is also adapted to provide a drive connection for a power take-off device such as a hydraulic pump or the like. For this reason, a second power transfer member 126 is adapted to be connected to second end portion 18 of power transmission member 14. For this purpose, second power transfer member 126 includes a plurality of mounting lobes or flanges 128, each of which is provided with a respective through hole 130 for use in attaching second power transfer member 126 to a specified power take-off device. The second power transfer member 126 also includes an axially extending portion 132 terminating in a radially extending surface 134 that is positioned directly adjacent the inner race of third bearing unit 80. Thus, radially extending surface 134 axially positions and holds the inner race of third bearing unit 80 against central portion 24, with ring 84 being sandwiched between the inner race of third bearing unit 80 and central portion 24. Axially extending portion 132 also includes an inner axial surface 136 that is interconnected to second end portion 18 of power transmission member 14 through a coupling unit 137. In a manner directly analogous to coupling unit 102, coupling unit 137 includes inner and outer radially spaced, annular wedge elements 138 and 140, first and second axially spaced, annular wedge elements 142 and 144 and a plurality of threaded fasteners 146. In essence, the interconnection between second power transfer member 126 and power transmission member 14 provided by coupling unit 137 is identical to that described above with respect to the use of coupling unit 102 such that wedge elements 138, 140, 142 and 144 transmit torque between power transmission member 14 and second power transfer member 126 through surface pressure, without developing any axial loads that bear upon the inner race of third bearing unit 80.

Based on the above, it should be readily apparent that rotational control apparatus 10 can be made more axially compact with power transfer members 88 and 126 functioning to retain inner races of bearing units 30 and 80, while coupling units 102 and 137 provide the necessary torque transfer path between power transmission member 14 and power transfer members 88 and 126 respectively. In addition, given the construction of and radial clamping loads developed by coupling units 102 and 137, the inner races of bearing units 30 and 80 do not experience service pressure stresses due to axial loading by the power transfer members 88 and 126. Therefore, internal clearances of the bearings 30 and 80 can be maintained and premature bearing failure can be avoided.

Figure 2:
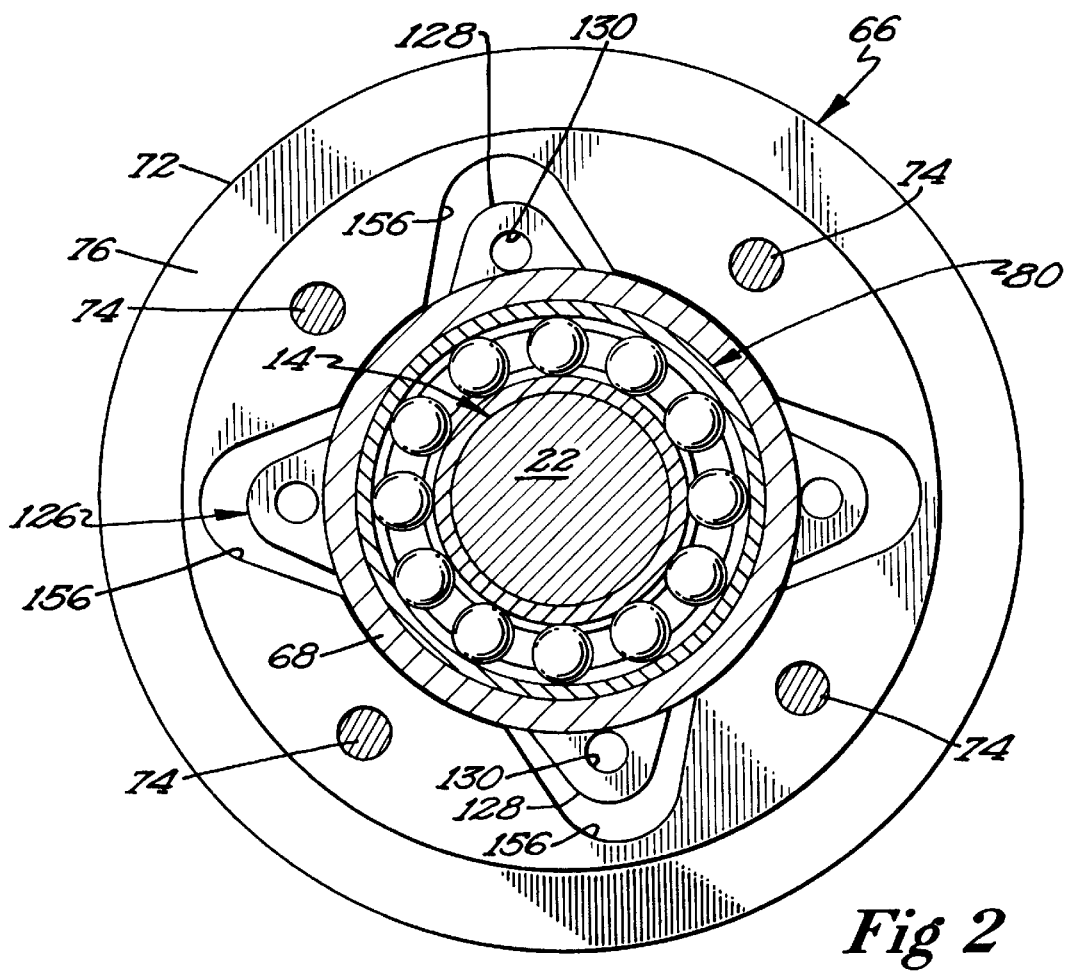
FIG. 2 is a cross-sectional view generally taken along line 2—2 in FIG. 1.

Since rotational control apparatus 10, in the preferred embodiment shown and described, constitutes a fan clutch, it will be necessary to install and sometimes replace the fan. Specifically, output element 66 is advantageously divided into the first and second output members 68 and 72. In order to enable removal of second output member 72, a plurality of enlarged cut-out sections 156 are formed in second output member 72 as clearly shown in FIGS. 1 and 2. More specifically, each cut-out section 156 is sized larger than a respective mounting flange 128 such that second output member 72 can be detached from first output member 68 by the removal of fasteners 74 and slid over power transfer member 126.

Figure 3:
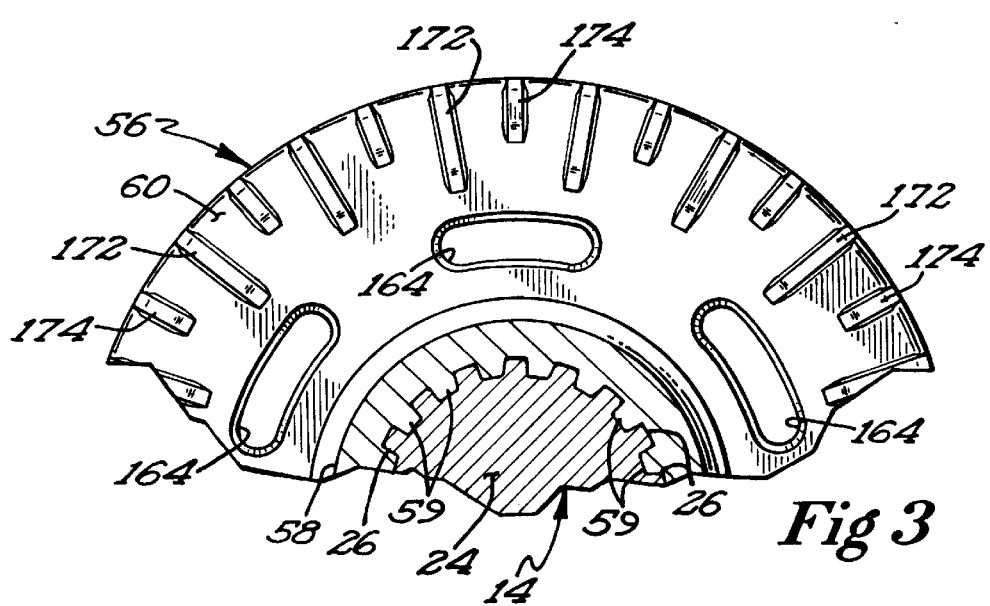
FIG. 3 is a cross-sectional view generally taken along line 3—3 in FIG. 1.

Furthermore, in accordance with another aspect of the present invention, it is desired to create a flow of cooling air during operation of rotational control apparatus 10 that will aid in dissipating heat generated by the frictional engagement between friction element 56 and interface element 64. During operation of rotational control apparatus 10, air is caused to be drawn into cutout sections 156 such that these sections define air inlet passages formed in second output member 72 of output element 66. These air inlet passages are aligned with sub-passages 158 formed in first output member 68. Sub-passages 158 lead to a first channel 162 that extends radially outwardly between disc portion 60 of friction element 56 and interface element 64. In addition, disc portion 60 is also provided with a plurality of spaced holes 164, which preferably take the form of elongated arcuate slots as best shown in FIG. 3, that open up into a second radially extending channel 168 arranged between friction element 56 and actuation member 38. As clearly shown in FIG. 1, holes 164 preferably open into channel 168 at a position opposite second bearing unit 54 such that a flow of forced air is provided to cool bearing unit 54, thereby increasing the life of bearing unit 54 by reducing grease breakdown. Due to the presence of channels 162 and 168, the air will also flow on both sides, as well as through, friction element 56, thereby increasing the thermal dissipation capacity of friction element 56 which allows for greater cycling times of rotational control apparatus 10.

In order to develop the flow of cooling air, friction element 56 is preferably formed with a plurality of fins.

More specifically, as best shown in FIG. 3, friction element 56 is preferably formed with a first group of fins 172, that alternate with a second group of fins 174, along an outer radial surface portion of friction element 56. As clearly shown in this Figure, the first group of fins 172 are elongated relative to the second group of fins 174. In addition, secondary fins 178 are preferably formed on extension portion 52 of actuation member 38 with the secondary fins 178 functioning to develop an air vortex to further enhance the cooling function.

It should be noted that, not only does the forced air cool friction element 56 and bearing unit 54, the flow of air advantageously keeps dirt and debris away from the frictional interface between elements 56 and 64. Therefore, based on the provision of fins 172 and 174 on friction element 56 will develop a continual flow of air to be drawn through the passages 156 and 158 formed in output element 66, forced over the interface between friction element 56 and interface element 64 and directed through friction element 56 to bearing unit 54. Therefore, in general, this air flow functions to enhance the operation of rotational control apparatus 10 while increasing the useful life of its components.

Now that the basic teachings of the present invention have been explained, many extensions and variations will be obvious to one having ordinary skill in the art. For example, although rotational control apparatus 10, in the most preferred form, includes several unique features which are believed to provide synergistic results, such features could be utilized separately or in other combinations.

Thus, the invention disclosed herein may be embodied in other specific forms without departing from the spirit or general characteristics thereof and the embodiment described herein is to be considered in all respects illustrative and not restrictive. Instead, the scope of the invention is to be indicated by the appended claims, rather than by the foregoing description, and all changes, within the meaning and range of equivalency of the claims are intended to be embraced therein.

I claim:

1. Apparatus for providing rotational control comprising in combination: an output element mounted to a power transmission member, adjacent an end portion of the power transmission member, through at least one bearing providing for relative rotation between the power transmission member and the output element, with the output element being adapted to be drivingly connected to the power transmission member through a friction element that rotates in unison with the power transmission member and which is selectively, axially shiftable into engagement with the output element by an actuation member, a power transfer member having a first axial end portion adapted to be attached to a rotatable power unit and a second axial end portion terminating in a radially extending surface, with the second axial end portion being positioned about the end portion of the power transmission member and the radially extending surface being arranged directly adjacent the at least one bearing; and means, for coupling the second axial end portion of the power transfer member to the end portion of the power transmission member without inducing axial stresses on the at least one bearing through the radially extending surface of the power transfer member during operation of the rotational control apparatus; a plurality of annularly spaced passages extending axially through the output element, with the output element being formed from at least first and second output members which are interconnected by a plurality of fasteners, with the second output member being removable from a remainder of the apparatus, with the first and second output members defining a mounting recess adapted to receive a mounting ring of an output unit to be axially positioned and clamped between the first and second output members, with each of the plurality of annularly spaced passages being defined by a first sub-passage extending through the first output member and a second sub-passage, adapted to receive an input flow of cooling air during operation of the rotational control apparatus, extending through the second output member in alignment with the first sub-passage, with the first sub-passage defining an outlet exposed to the friction element.

2. In an apparatus for providing rotational control of an output element that is mounted for rotation relative to a power transmission member and which is adapted to be drivingly connected to the power transmission member through a friction element that rotates in unison with the power transmission member and which is selectively, axially shiftable into engagement with the output element by an actuation member, a forced air cooling system comprising, in combination: a plurality of annularly spaced passages extending axially through the output element, with the output element being formed from at least first and second output members which are interconnected by a plurality of fasteners, with the second output member being removable from a remainder of the apparatus, with the first and second output members defining a mounting recess adapted to receive a mounting ring of an output unit to be axially positioned and clamped between the first and second output members, with each of the plurality of annularly spaced passages being defined by a first sub-passage extending through the first output member and a second sub-passage, adapted to receive an input flow of cooling air during operation of the rotational control apparatus, extending through the second output member in alignment with the first sub-passage, with the first sub-passage defining an outlet exposed to the friction element.

3. The air cooling system of claim 2 wherein the second sub-passage of each of the plurality of passages is defined by a cut-out section of the second output member and is sized larger than the first sub-passage.

4. In an apparatus for providing rotational control of an output element that is mounted for rotation relative to a power transmission member and which is adapted to be drivingly connected to the power transmission member through a friction element that rotates in unison with the power transmission member and which is selectively, axially shiftable into engagement with the output element by an actuation member, a forced air cooling system comprising, in combination: a plurality of annularly spaced passages extending axially through the output element, with the output element being formed from at least first and second output members which are interconnected by a plurality of fasteners, with the second output member being removable from a remainder of the apparatus, with each of the plurality of annularly spaced passages being defined by a first sub-passage extending through the first output member and a second sub-passage, adapted to receive an input flow of cooling air during operation of the rotational control apparatus, extending through the second output member in alignment with the first sub-passage, with the first sub-passage defining an outlet exposed to the friction element, wherein the second output member includes an annular opening slidably mounted about a portion of the first output member.

5. The air cooling system of claim 4 wherein the second sub-passage of each of the plurality of passages is defined by a cut-out section of the second output member and is sized larger than the first sub-passage, with each of the cut-out sections extending from the annular opening of the second output member.

6. The air cooling system of claim 5 further comprising, in combination: a power transfer member drivingly connected to the power transmission member on a side of the output element defined by the second output member, with the power transfer member being formed with a plurality of circumferentially spaced, axially extending lobes for use in attaching the power transfer member to a power take-off component, with the second sub-passages being sized and shaped larger than the lobes to enable the second output member to be slid over the power transfer member.

7. The air cooling system of claim 6 further comprising, in combination: a first channel defined, at least in part, by a radially extending surface of the friction element; a plurality of holes extending axially through the friction element at annularly spaced locations, with each of the holes having an inlet side adapted to receive a supply of cooling air flowing through the passages and an outlet side; and a second channel, exposed to a bearing unit supporting the friction element upon the actuation member for relative rotation, leading radially from the outlet side of the plurality of holes wherein, during operation of the apparatus, air is caused to flow through the passages formed in the output element, within the first channel wherein the air is exposed to the friction element, through the holes formed in the friction element and within the second channel wherein the air is exposed to the bearing unit.

8. The air cooling system of claim 7 further comprising, in combination: a plurality of first fins projecting axially into the second channel from the friction element for generating a flow of cooling air through the apparatus.

9. The air cooling system of claim 8 wherein the plurality of first fins are constituted by first and second, circumferentially spaced fin groups, with each of the fins in the first fin group having an associated radial length which is greater than a radial length associated with each of the fins in the second fin group.

10. The air cooling system of claim 9 wherein the fins of the first and second fin groups are alternatively arranged about an outer radial surface portion of the friction element.

11. The air cooling system of claim 8 further comprising, in combination: a plurality of second fins for developing a vortex, with the plurality of second fins being formed on the actuation member.

12. The air cooling system of claim 7 wherein the holes extending axially through the friction element are defined by elongated, annularly spaced slots.

13. In a rotational control apparatus including a power transmission member having an element mounted, directly adjacent an end portion of the power transmission member through at least one bearing providing for relative rotation between the power transmission member and the element, a power transfer assembly comprising, in combination: a power transfer member having a first axial end portion adapted to be attached to a rotatable power unit and a second axial end portion terminating in a radially extending surface, with the second axial end portion being positioned about the end portion of the power transmission member and the radially extending surface being arranged directly adjacent the at least one bearing; and means for coupling the second axial end portion of the power transfer member to the end portion of the power transmission member without inducing axial stresses on the at least one bearing through the radially extending surface of the power transfer member during operation of the rotational control apparatus.

14. The power transfer assembly of claim 13 wherein the coupling means is positioned radially between the end portion of the power transmission member and the second axial end portion of the power transfer member, with the power transfer member and the power transmission member being drivingly interconnected through radial expansion of the coupling means.

15. The power transfer assembly of claim 14 wherein the coupling means comprises a plurality of wedging elements radially interposed between the end portion of the power transmission member and the second axial end portion of the power transfer member.

16. The power transfer assembly of claim 15 wherein the wedging elements include a pair of radially spaced, annular wedge elements, each of which radially tapers, along its axial length, from a central axial portion thereof, and a pair of axially spaced wedge elements positioned between the radially spaced wedge elements, with the coupling means further comprising means for axially drawing the axially spaced wedge elements together thereby radially clamping the power transfer member to the end portion of the power transmission member.

17. The power transfer assembly of claim 16 wherein the means for axially drawing comprises a plurality of fasteners interconnecting the axially spaced wedge elements.

18. The power transfer assembly of claim 16 wherein each of the axially spaced wedge elements takes the form of a truncated, conical wedge element.

19. The power transfer assembly of claim 15 wherein the end portion of the power transmission member is smooth.

20. The power transfer assembly of claim 15 wherein the power transmission member includes a second end portion, the rotational control apparatus includes an output element rotatably mounted directly adjacent the second end portion through a second bearing and the power transfer assembly further comprises, in combination: a second power transfer member having a first axial end portion adapted to be attached to a second rotatable power unit and a second axial end portion terminating in a second radially extending surface, with the second axial end portion of the second power transfer member being positioned about the second end portion of the power transmission member and the second radially extending surface being arranged directly adjacent the second bearing; and second coupling means for drivingly interconnecting the second axial end portion of the second power transfer member to the second end portion of the power transmission member without inducing axial stresses on the second bearing through the second radially extending surface during operation of the rotational control apparatus.

21. The power transfer assembly of claim 20 further comprising, in combination: a friction disc positioned intermediate the end portions of the power transmission member and drivingly interconnected with and axially shiftably mounted for movement between an engaged position, wherein the friction disc is caused to engage the output element, and a disengaged position, wherein the power transmission member is rotatable relative to the output element.

\* \* \* \* \*

UNITED STATES PATENT AND TRADEMARK OFFICE
CERTIFICATE OF CORRECTION

PATENT NO : 5,896,971

DATED : April 27, 1999

INVENTOR(S) : David Hein

It is certified that error appears in the above-identified patent and that said Letters Patent is hereby corrected as shown below:

Title page, item [57],

In the Abstract, line 14, after (66), insert -- , -- .

Column 1, line 37, delete "of" and insert -- Of -- .

Column 2, line 57, delete the "." after the word "present".

Column 6, line 45, delete "cutout" and insert -- cut-out -- .

Column 7, line 41, at the end of the line, after the word "comprising", insert -- , -- .

Column 9, line 52, at the end of the line, delete the word "directly".

Signed and Sealed this

Sixteenth Day of November, 1999

Attest:

Q. TODD DICKINSON

*Attesting Officer*  *Acting Commissioner of Patents and Trademarks*